US008029216B2

(12) United States Patent
Guy

(10) Patent No.: US 8,029,216 B2
(45) Date of Patent: Oct. 4, 2011

(54) CHUCK AND ARTICLE HAVING MATING FEATURES TO PREVENT AXIAL SLIPPAGE

(75) Inventor: Hanoch Guy, Petach Tikva (IL)

(73) Assignee: Iscar, Ltd., Tefen (IL)

( * ) Notice: Subject to any disclaimer, the term of this patent is extended or adjusted under 35 U.S.C. 154(b) by 1126 days.

(21) Appl. No.: 11/689,148

(22) Filed: Mar. 21, 2007

(65) Prior Publication Data

US 2007/0231094 A1  Oct. 4, 2007

(30) Foreign Application Priority Data

Apr. 2, 2006  (IL) .......................................... 174722

(51) Int. Cl.
  *B23B 31/20* (2006.01)
(52) U.S. Cl. ......... 408/240; 408/226; 279/42; 279/46.4; 279/48
(58) Field of Classification Search .................. 408/226, 408/240; 279/42, 43.1, 43.4, 43.5, 46.3, 279/46.4, 48, 69; *B23B 31/20*
See application file for complete search history.

(56) References Cited

U.S. PATENT DOCUMENTS

| 1,701,172 | A | * | 2/1929 | Brown | 433/115 |
| 2,626,667 | A | * | 1/1953 | Spiller | 279/46.3 |
| 2,896,956 | A |  | 7/1959 | Ann |  |
| 3,379,446 | A |  | 4/1968 | Bennati |  |
| 3,425,704 | A |  | 2/1969 | Dickson |  |
| 3,762,731 | A |  | 10/1973 | Matsumoto |  |
| 3,819,195 | A |  | 6/1974 | Lehde |  |
| 4,710,075 | A | * | 12/1987 | Davison | 408/202 |
| 5,167,476 | A | * | 12/1992 | Lafferty et al. | 408/240 |
| 5,234,296 | A | * | 8/1993 | Presby et al. | 409/234 |
| 5,324,050 | A |  | 6/1994 | Kanaan |  |
| 5,405,220 | A |  | 4/1995 | Ishikawa |  |
| 5,460,388 | A | * | 10/1995 | Lewis et al. | 279/42 |

(Continued)

FOREIGN PATENT DOCUMENTS

EP  0013645  1/1980

(Continued)

OTHER PUBLICATIONS

International Search Report, PCT/IL2007/000367, dated Aug. 31, 2007.

(Continued)

*Primary Examiner* — Eric A Gates
(74) *Attorney, Agent, or Firm* — Womble Carlyle

(57) ABSTRACT

A chuck and an article are configured such that the article is releasably secured in the chuck. One of the chuck and article is provided with a crest and the other with a trough. When the article is secured to the chuck, the crest enters the trough so as help prevent slippage of one with respect to the other. The chuck may include a receiver having a tapered bore, a collet having a complementarily tapered outer surface, and a nut configured to be threadingly secured to a forward end of the receiver; the article may be a shank, such as a tool shank. An inner surface of the collet may be provided with a crest which is configured to fit into a trough formed on the shank. In a secured position, the shank is accommodated in the bore of the collect with the crest of the collet at least partially occupying the trough of the shank, thereby preventing movement of the shank relative to the collet, which itself is accommodated in the bore of the receiver.

15 Claims, 4 Drawing Sheets

U.S. PATENT DOCUMENTS

| | | | |
|---|---|---|---|
| 5,957,634 A * | 9/1999 | Carpinetti | 408/226 |
| 6,746,023 B2 | 6/2004 | Komine | |
| 6,886,835 B2 | 5/2005 | Komine | |
| 6,923,451 B2 * | 8/2005 | Taguchi et al. | 279/42 |

FOREIGN PATENT DOCUMENTS

| | | |
|---|---|---|
| EP | 0013646 | 7/1980 |
| EP | 0263982 | 9/1987 |
| EP | 0263982 | 4/1988 |
| EP | 1049555 | 11/1999 |
| EP | 1616647 | 7/2005 |
| GB | 551720 | 3/1943 |
| GB | 565164 | 10/1944 |
| GB | 729051 | 5/1955 |
| GB | 802769 | 10/1958 |
| GB | 808787 | 2/1959 |
| GB | 827169 | 2/1960 |
| GB | 1379700 | 1/1975 |
| JP | 2004025349 | 1/2004 |
| RU | 90 U1 | 10/1994 |
| SU | 900996 | 1/1982 |

OTHER PUBLICATIONS

Office Action dated Apr. 6, 2011 in counterpart Russian Application No. 2008138995/02.

* cited by examiner

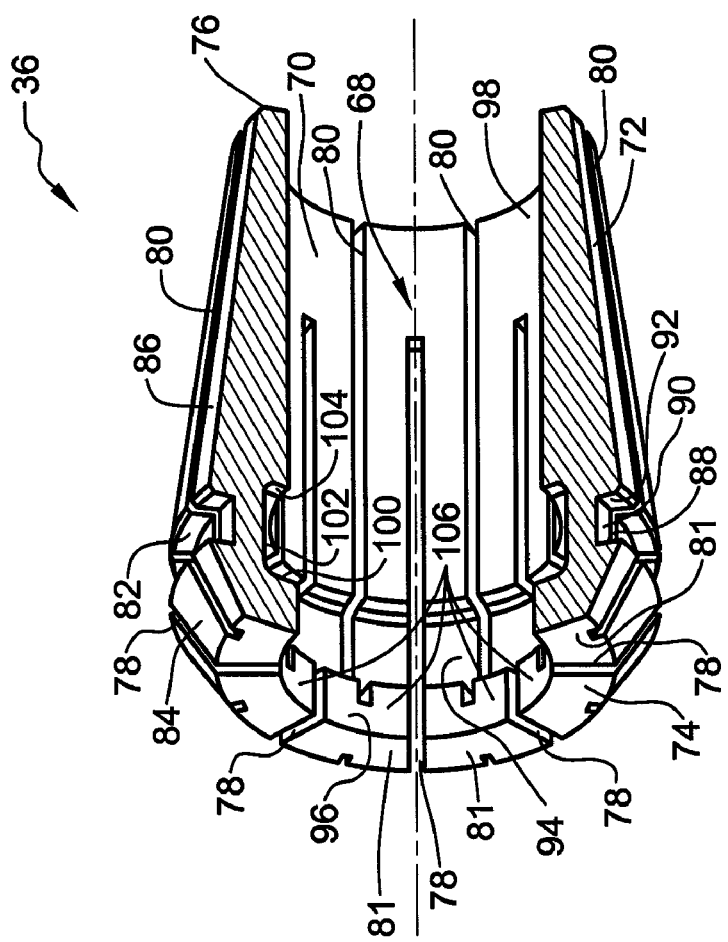
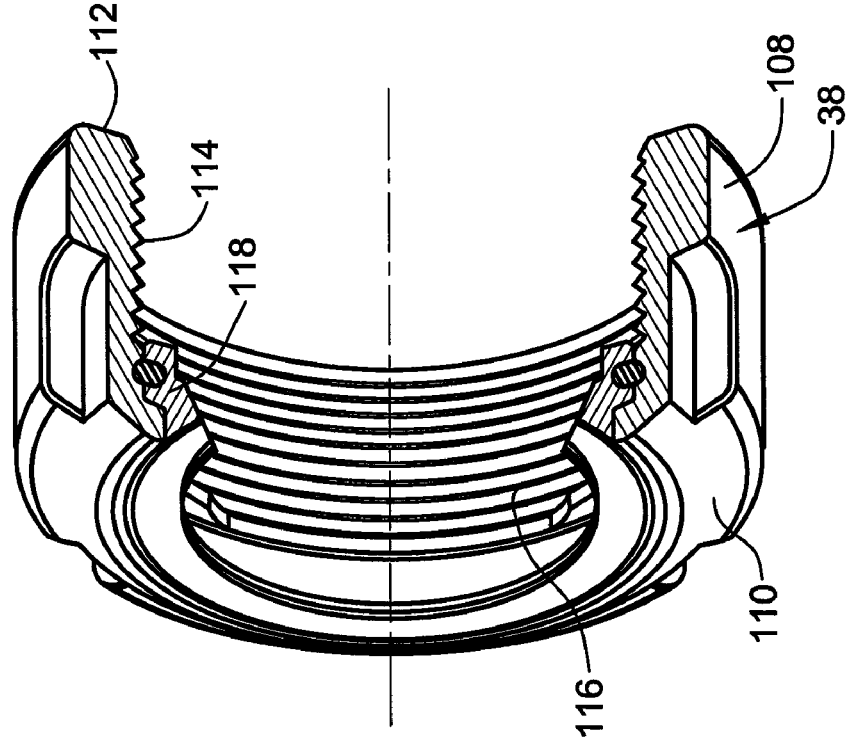

CHUCK AND ARTICLE HAVING MATING FEATURES TO PREVENT AXIAL SLIPPAGE

BACKGROUND

Chucks, which removably secure articles, such as tools or work-pieces, to machine tools, are well known in the art. Such chucks may employ flexible collets, which may expand or contract radially, to releasably grip the article in the chuck.

It has been known that occasionally, the gripped article may slide axially relative to the chuck, especially when relatively large axial cutting forces act on the article. Such axial sliding is undesirable, and may adversely affect the quality of the work-piece, the life of the tool, or both.

It is an object of the present disclosure to present an improved chuck. This object is attained with the subject matter in accordance with the claims.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other advantages or improvements.

Also provided is an apparatus comprising a chuck and an article having a common longitudinal axis L, the apparatus further comprising a longitudinally extending through-hole formed in the chuck, designed to accommodate the article; one of the article or the through-hole being formed with a crest, and the other of the article or the through-hole being formed with a trough; the chuck being transferable between chuck releasing and chuck securing positions; wherein in the releasing position, the article is slidable relative to the through-hole of the chuck; and in the securing position, the crest is accommodated in the trough, preventing the article from sliding relative to the chuck. The chuck can further comprise a collet with the through-hole formed in the collet. Optionally a nut may be threadingly secured to a forward end of the chuck, while the nut being in abutment with the collet.

There is also provided a method for securing an article in a chuck, comprising the steps of:

(i) providing the article with a peripheral envelope, providing the chuck with a through-hole extending therethrough, the through-hole having a through-hole envelope formed therein; providing one of the article or the chuck with a crest formed on either the through-hole or the peripheral envelopes, respectively; and, providing the other of the article or the chuck with a trough formed on either the through-hole or the peripheral envelopes, respectively, with the chuck being transferable between a releasing position and a securing position;

(ii) transferring the chuck to the releasing position, whereby the article may slide into and relative to the through-hole;

(iii) inserting the article at least partially into the through-hole, so that the crest is positioned opposite the trough; and (iv) transferring the chuck to the securing position, whereby the crest is at least partially accommodated in the trough.

Optionally, inserting the article at least partially into the through-hole comprises inserting the article into a through-hole of a collet within the chuck.

If desired, transferring the chuck to the securing position can comprise tightening the nut over a forward end of the chuck. Typically, tightening the nut urges the collet rearwardly into a tapered bore of the chuck, thereby contracting the collet in a radially inward direction.

In another aspect, the present invention is directed to a cutting tool assembly having a longitudinal axis L defining a front-to-rear direction. The assembly comprises a collet and a shank. The collet has a through-bore extending along said longitudinal axis, an inner surface of the collet comprising a peripheral inner slot and a crest, the crest comprising a collet front, an axially rearwardly facing first slot face, and a front inner surface extending between the collet front and the first slot face, at least a portion of the front inner surface being radially inward of the peripheral inner slot. The shank extends along the longitudinal axis and is releasably secured in said through-bore, the shank comprising a shank peripheral envelope having a peripheral shank slot formed therein, the shank slot defining a trough comprising an axially rearwardly facing first slot side, an opposing axially forwardly facing second slot side, and a slot base extending therebetween. The collet is transferable between a releasing position in which the tool shank is accommodated in, and slidable through, the collet through-bore, with the crest positioned outside of the trough; and a securing position in which the crest is at least partially accommodated in the trough. Optionally, the cutting tool assembly comprises: a chuck with a receiver, which has a bore, and a nut; the collet that is accommodated in the bore of the receiver, whereas the nut is threadingly engaged to the receiver and abuts the collet. If desired, the nut comprises a nut forcing cone which abuts the collet. Typically, the shank peripheral envelope has a plurality of peripheral shank slots formed: therein. Optionally, the plurality of peripheral shank slots are evenly spaced apart along an axial portion of the shank.

In addition to the exemplary aspects and embodiments described above, further aspects and embodiments will become apparent by reference to the accompanying illustrative figures and drawings and by study of the following detailed descriptions.

BRIEF DESCRIPTION OF THE FIGURES

Exemplary embodiments are demonstrated in the accompanying illustrative figures and drawings. It is intended that the exemplary embodiments and illustrative figures disclosed herein are considered illustrative rather than restrictive.

In the accompanying illustrative figures:

FIG. 4 is a partial section perspective view of a collet of the chuck shown in FIG. 1;

FIG. 5 is a partial section perspective view of a nut of the chuck shown in FIG. 1.

Figure 1:
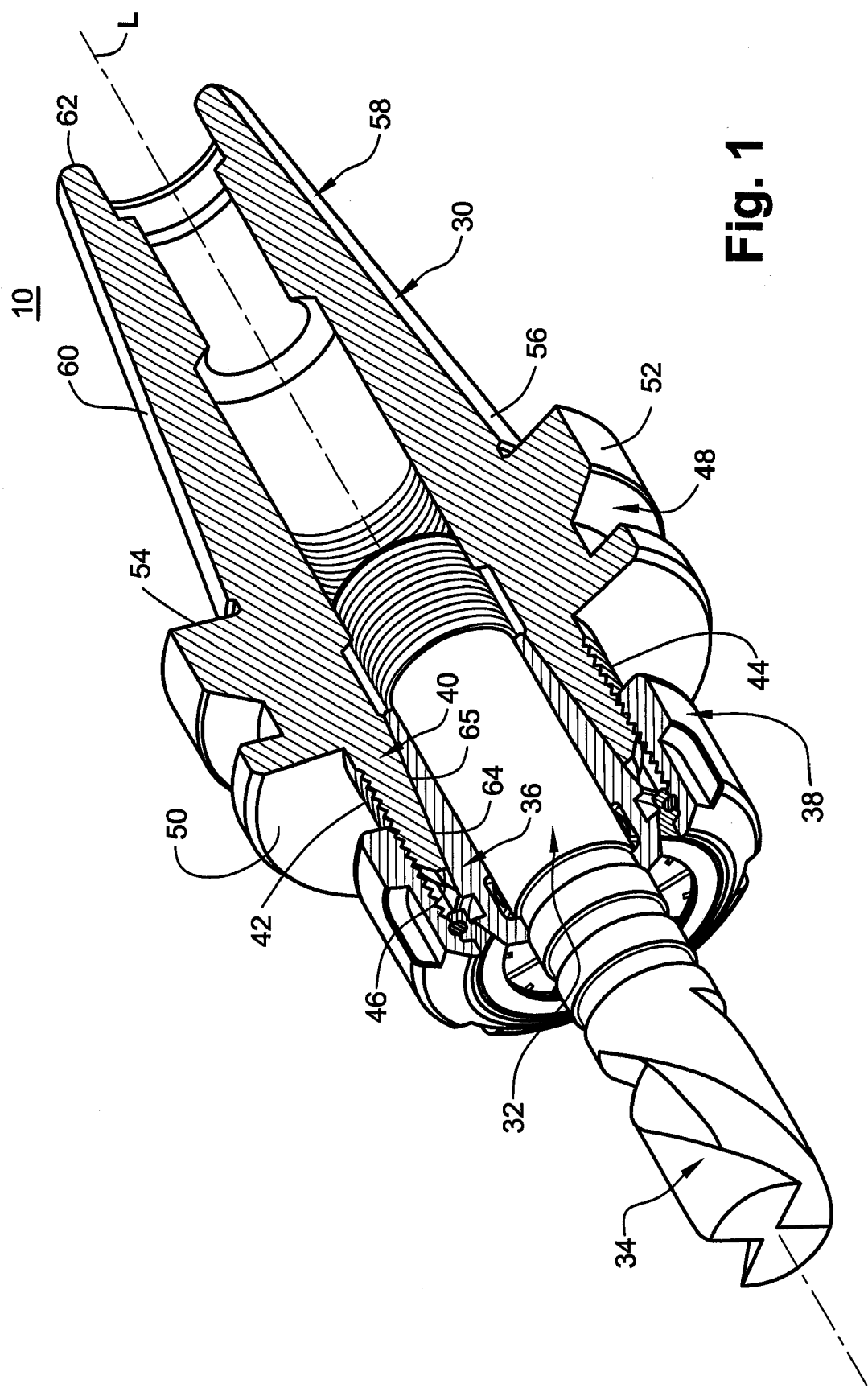
FIG. 1 is a perspective view of an assembly comprising a chuck and an article secured therein in accordance with an exemplar embodiment.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated within the figures to indicate like elements.

DETAILED DESCRIPTION

Figure 2:
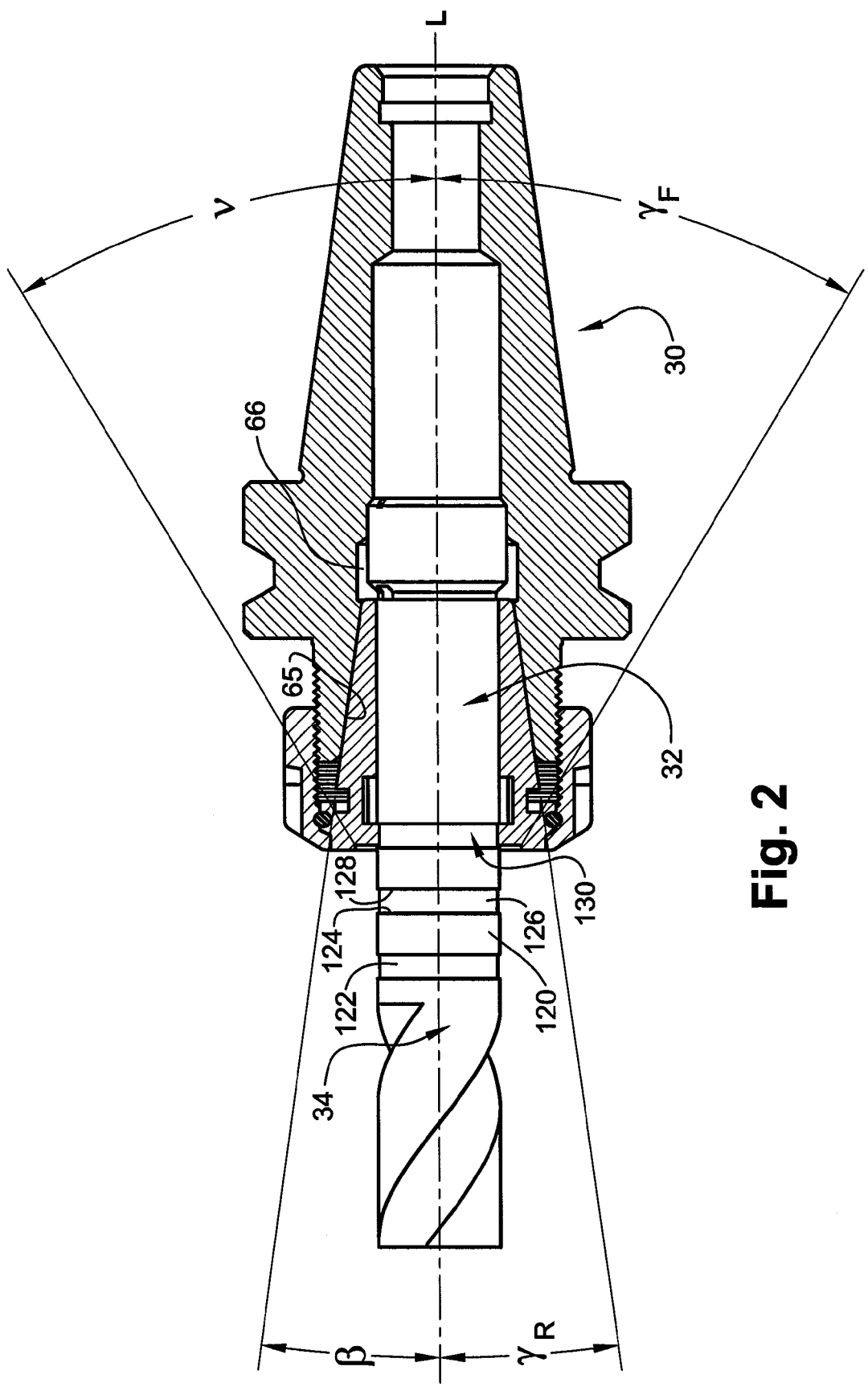
FIG. 2 is a cross-section taken in a plane of a longitudinal axis L of the assembly shown in FIG. 1.
Figure 3:
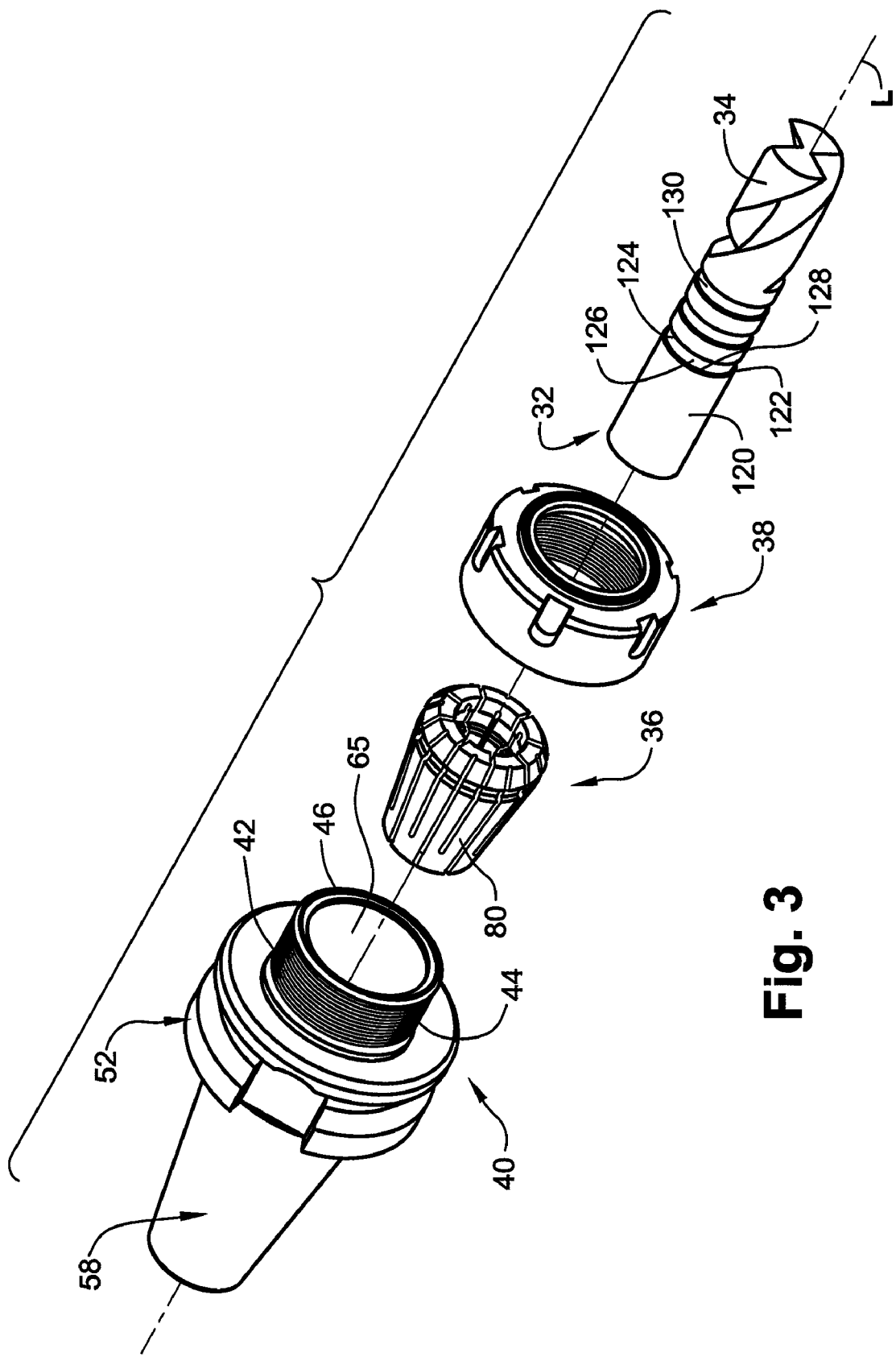
FIG. 3 is an exploded perspective view of the assembly shown in FIG. 1.

Attention is drawn to an assembly 10 and its components, seen in FIGS. 1 to 5. A chuck 30 releasably grips an article 32, which may be, for example, a shank 32 of a rotary cutting tool, such as an end mill 34. The chuck 30 has a longitudinal axis L defining a front-to-rear direction, and accommodates a collet 36 secured therein by a nut 38 in a front receiver 40 thereof. The receiver 40 has a generally cylindrical receiver outer envelope 42 with a receiver male thread 44 formed thereon. The receiver outer envelope 42 extends rearwardly from a receiver front 46 to a flange 48 having a forwardly-facing flange front face 50. The flange front face 50 extends outwardly away from the receiver outer envelope 42 to a flange peripheral envelope 52. The flange peripheral envelope 52 extends rearwardly from the flange front face 50 to a rearwardly facing flange rear face 54. The flange rear face 54 extends inwardly away from the flange peripheral envelope 52 to a mount front 56 of a rear mount 58. The mount 58 has a mount envelope 60 which extends rearwardly from the mount front 56 coaxially with the longitudinal axis L while tapering inwardly to a mount rear 62. Thus, the mount 58 is of a generally frustoconical shape, and is adapted to be releasably mountable in a rotary machine tool, such as, for example, a milling machine (not shown). The shape and function of the mount 58 and the flange 48 are not critical and therefore they will not be further discussed herein below.

The receiver 40 has a tapered bore 64 having a frustoconical bore surface 65 formed therein. The bore surface 65 extends rearwardly from the front 46 coaxially with the longitudinal axis L while converging inwardly to terminate at a bore rear end 66, to define a bore cone angle $\beta$ with the longitudinal axis L.

The collet 36 has an inner clamping through-hole 68 defined by a through-hole envelope 70, as well as an outer collet envelope 72. Both the through-hole envelope 70 and the collet envelope 72 extend rearwardly from a collet front 74 to a collet rear 76. The collet 36 has a plurality of alternating first slots 78 and second slots 80 extending radially between, and opening to, the through-hole envelope 70 and the collet envelope 72. The first slots 78 open to the collet front 74 and extend rearwardly therefrom towards the collet rear 76. The second slots 80 open to the collet rear 76 and extend forwardly therefrom towards the collet front 74. The first and second slots 78, 80 facilitate radial expansion and contraction of the collet 36, so that an inner diameter of the through-hole 68 may change to grip a variety of articles having differing diameters. The first slots 78 define a plurality of first fingers 81 therebetween. Each of the first fingers 81 extends rearwardly from the collet front 74 to merge with adjacent first fingers 81 at the collet rear 76. Similar collets are known, for example, from GB551720, GB565164, GB802769, GB808787, GB827169, GB1048458, GB1379700, GB1080771, GB1394328, GB729051, EP0013645, EP0263982, EP0618030, EP1049555, EP1616647, U.S. Pat. Nos. 5,324,050, 6,746,023, 6,886,835, and JP2004025349, which are incorporated herewith by reference.

The collet envelope 72 has a peripheral outer slot 82 formed therein, defining a front outer surface 84 and a rear outer surface 86. The front outer surface 84 extends rearwardly from the collet front 74 while tapering radially outwardly to a rearwardly facing first slot wall 88. The front outer surface 84 forms a generally frustoconical shape defining an acute front cone angle $\gamma_F$ with the longitudinal axis L. The first slot wall 88 extends radially inwardly from the front outer surface 84 to a radially outwardly facing outer slot bottom 90. The outer slot bottom 90 extends axially rearwardly from the first slot wall 88 to a forwardly facing second slot wall 92. The second slot wall 92 extends radially outwardly from the outer slot bottom 90 to the rear outer surface 86. The rear outer surface 86 extends rearwardly from the second slot wall 92 while tapering radially inwardly to the collet rear 76. The rear outer surface 86 forms a generally frustoconical shape defining an acute rear cone angle $\gamma_R$ with the longitudinal axis L. Generally, the rear cone angle $\gamma_R$ is smaller than the front cone angle $\gamma_F$ ($\gamma_R < \gamma_F$). In accordance with an exemplar embodiment, the rear cone angle $\gamma_R$ is equal to the bore cone angle $\beta$.

A peripheral inner slot 94 is formed in the through-hole envelope 70, defining a front inner surface 96 and a rear inner surface 98. At least a portion of the front inner surface 96 is radially inward of the peripheral inner slot 94, relative to the longitudinal axis L. The front inner surface 96 extends across the plurality of front fingers 81 and axially rearwardly from the collet front 74 to an axially rearwardly facing first slot face 100. The first slot face 100 extends radially outwardly from the front inner surface 96 to a radially inwardly facing slot floor 102. The slot floor 102 extends axially rearwardly from the first slot face 100 to an axially forwardly facing second slot face 104. The second slot face 104 extends radially inwardly from the slot floor 102 to the rear inner surface 98. The first slot face 100, the front inner surface 96, the collet front 74, and two adjacent first slots 78 define an inner collet crest 106 on each of the first fingers 81.

The nut 38 has a nut outer envelope 108 extending rearwardly from an axially forwardly facing nut front 110 to an axially rearwardly facing nut rear 112. A nut inner envelope 114 extends forwardly from the nut rear 112 to the nut front 110. The nut inner envelope 114 has a female thread 116 formed therein, extending forwardly from the nut rear 112, to terminate adjacent a nut forcing cone 118. The nut forcing cone 118 extends forwardly from the female thread 116 to the nut front 110 while tapering inwardly, to form a generally frustoconical shape defining an acute nut cone angle $\nu$ with the longitudinal axis L. In accordance with the exemplar embodiment, the nut cone angle $\nu$ is equal to the front cone angle $\gamma_F$.

The shank 32 has a shank peripheral envelope 120, which extends peripherally thereabout, generally parallel to the longitudinal axis L. In the exemplar embodiment, a plurality, and in this instance three, peripheral shank slots 122 are formed in the shank peripheral envelope 120 and may be evenly spaced apart along an axial portion of the shank 32. However, any number of shank slots 122 may be formed in the shank peripheral envelope 120. Each shank slot 122 has a rearwardly facing first slot side 124 extending inwardly from the shank peripheral envelope 120 to a slot base 126. The slot base 126 extends from the first slot side 124 rearwardly to an axially forwardly facing second slot side 128. The second slot side 128 extends outwardly from the slot base 126 to the shank peripheral envelope 120. The first slot side 124, the slot base 126, and the second slot side 128 define a shank trough 130.

The chuck 30 is assembled by placing the collet 36 with the collet rear 76 adjacent the bore rear end 66, with the rear outer surface 86 of the collet 36 abutting the bore surface 65, and with the outer slot 82 and the front outer surface 84 of the collet 36 extending forwardly relative to the receiver front 46. The nut 38 is placed on the receiver 40 with the female thread 116 of the nut 38 engaging the male thread 44 of the receiver 40, and is threadingly tightened thereon, until the nut forcing cone 118 abuts the front outer surface 84 of the collet 36, so that the chuck 30 is brought to a releasing position. In the releasing position, the crest 106 is located outside of the trough 130 so that the shank 32 may be inserted and slid relative to the through-hole 68.

To clamp the article 32 in the chuck 30, the shank 32 is inserted into the through-hole 68 of the collet 36, so that the shank peripheral envelope 120 faces the through-hole envelope 70, and the trough 130 of the shank 32 is set opposite the crest 106 of the collet 36. The article is clamped in the chuck 30 by bringing the chuck 30 to a clamping position, by further tightening of the nut 38 relative to the releasing position. Since the bore cone angle β of the bore envelope 65, and the corresponding rear cone angle $γ_R$ of the rear outer surface 86 are smaller than the nut cone angle ν of the forcing cone 118, and the corresponding front cone angle $γ_F$ of the front outer surface 86, such further tightening of the nut 38 urges the collet 36 rearwardly in the bore 64. As the collet 36 is urged rearwardly in the bore 64, it is wedged by the rearwardly inwardly converging bore envelope 65. However, the collet 36 is resilient, by virtue of the alternating first and second slots 78, 80 thereof. Therefore, as the collet 36 is wedged by the bore envelope 65, it contracts in a radially inward direction, until the rear inner surface 98 of the through-hole 68 abuts the shank peripheral envelope 120, bringing the chuck 30 to the clamping position, whereby the shank 32 is clamped in the chuck 30.

To secure the article in the chuck 30, the chuck 30 is brought to a securing position, by continuing to tighten the nut 38 to the receiver 40. However, the collet 36 can not be further urged rearwardly in the bore 64 and therefore bends, so that the crests 106 of each of the first fingers 81 are urged into the trough 130 of the shank 32 until the front inner surface 96 abuts the slot base 126. When the article is secured in the chuck 30, a force acting axially forwardly thereon will cause the shank 32 to slide axially forwardly relative to the collet 36 to a very small extent, until the second slot side 128 of the shank slot 122 abuts the first slot face 100 of the inner slot 94 of the collet 36, thereby preventing further forward sliding of the article relative to the shaft.

Although the present disclosure has described and illustrated an exemplar embodiment to a certain degree of particularity, it is to be clearly understood that this is done by way of illustration and example only and is not to be taken by way of limitation. The scope of the present disclosure is to be limited only by the terms of the appended claims, and alterations and modifications to the exemplar embodiment may possibly be made without departing from the scope of the disclosure as hereinafter claimed.

For example, while in the exemplar embodiment, the shank peropheral envelope is cylindrical, it may take on different shapes, such as oval or polygonal, so long as the inner surface of the collet is correspondingly formed. In addition, an article should not be construed as limited to a shank of a cutting tool; the angles β, ν, $γ_F$ and $γ_R$ may be modified to suit other geometrical configurations; the collet does not necessarily have a converging frustoconical rear portion; urging the crests of the collet into the trough of the article is not necessarily accomplished by tightening of a nut or by a conical portion formed thereon; and, a trough may be formed on the collet, while a crest may be formed on the article. Moreover, the crest must not be construed as necessarily being an integral part of the article or the collet. Therefore, unless otherwise such changes and modifications depart from the scope of the present invention, they should be construed as included therein.

What is claimed is:

1. A cutting tool assembly having a longitudinal axis L defining a front-to-rear direction and comprising:
  a chuck comprising:
    a receiver having a bore;
    a collet receivable into the bore of the receiver, the collet having a through-hole extending along said longitudinal axis, an inner surface of the collet comprising a peripheral inner slot and a crest, the crest comprising a collet front, an axially rearwardly facing first slot face, and a front inner surface extending between the collet front and the first slot face, at least a portion of the front inner surface being radially inward of the peripheral inner slot; and
    a nut threadingly engageable to the receiver and configured to abut the collet when the nut is threadingly engaged to the receiver; and
  a shank extending along said longitudinal axis and releasably secured in said through-hole, the shank comprising a shank peripheral envelope having a peripheral shank slot formed therein, the shank slot defining a trough comprising an axially rearwardly facing first slot side, an opposing axially forwardly facing second slot side, and a slot base extending therebetween;
  wherein the collet is transferable between:
    a releasing position in which the shank is accommodated in, and slidable through, the collet through-hole, with the crest positioned outside of the trough; and
    a securing position in which the crest is at least partially accommodated in the trough.

2. The cutting tool assembly according to claim 1, wherein: the nut comprises a nut forcing cone which abuts the collet.

3. The cutting tool assembly according to claim 1, wherein: the shank peripheral envelope has a plurality of peripheral shank slots formed therein.

4. The cutting tool assembly according to claim 3, wherein: the plurality of peripheral shank slots are evenly spaced apart along an axial portion of the shank.

5. The cutting tool assembly according to claim 1, wherein: the receiver has a generally cylindrical receiver outer envelope having a receiver thread;
the nut has a nut inner envelope having a nut thread; and
the nut thread is threadingly engaged to the receiver thread without being threadingly engaged to the collet, when the chuck is in the securing position.

6. The cutting tool assembly according to claim 5, wherein: the collet through-hole is defined by a through-hole envelope and an outer collet envelope which extend rearwardly from the collet front to a collet rear; and
the through-hole envelope forms at least a portion of the inner surface of the collet.

7. The cutting tool assembly according to claim 6, wherein: the receiver bore has a frustoconical bore surface which is tapered in a rearward direction along the longitudinal axis;
the outer collet envelope comprises a rear outer surface which tapers radially inwardly in the direction of a collet rear; and
the rear outer surface of the outer collet envelope abuts the frustoconical bore surface of the receiver bore, when the chuck is in the securing position.

8. The cutting tool assembly according to claim 6, wherein the collet has:
  a plurality of first slots which open to the collet front and extend rearwardly therefrom towards the collet rear; and
  a plurality of second slots which open to the collet rear and extend forwardly therefrom towards the collet front, wherein:
  the first slots alternate with the second slots in a circumferential direction of the collet.

9. The cutting tool chuck assembly according to claim 6, wherein:
the outer collet envelope has a peripheral outer slot which defines a front outer surface and a rear outer surface of the outer collet envelope; and the peripheral outer slot is opposite the peripheral outer slot.

10. A cutting tool chuck having a longitudinal axis L defining a front-to-rear direction and comprising:
- a receiver having a receiver bore;
- a collet receivable into the receiver bore, the collet having a through-hole extending along said longitudinal axis, an inner surface of the collet comprising a peripheral inner slot and a crest, the crest comprising a collet front, an axially rearwardly facing first slot face, and a front inner surface extending between the collet front and the first slot face, at least a portion of the front inner surface being radially inward of the peripheral inner slot; and
- a nut threadingly engageable to the receiver and configured to abut the collet when the collet is received into the receiver bore and the nut is threadingly engaged to the receiver;

wherein the chuck is transferable between:
- a disassembled position in which the receiver, collet and nut are separate from one another, and
- an assembled position in which the collet is received into the receiver bore and the nut is threadingly engaged to the receiver and abuts the collet.

11. The cutting tool chuck according to claim 10, wherein:
the receiver has a generally cylindrical receiver outer envelope having a receiver thread;
the nut has a nut inner envelope having a nut thread; and
the nut thread is threadingly engaged to the receiver thread without being threadingly engaged to the collet, when the chuck is in the assembled position.

12. The cutting tool chuck according to claim 10, wherein:
the collet through-hole is defined by a through-hole envelope and an outer collet envelope which extend rearwardly from the collet front to a collet rear; and
the through-hole envelope forms at least a portion of the inner surface of the collet.

13. The cutting tool chuck according to claim 12, wherein:
the receiver bore has a frustoconical bore surface which is tapered in a rearward direction along the longitudinal axis;
the outer collet envelope comprises a rear outer surface which tapers radially inwardly in the direction of a collet rear; and
the rear outer surface of the outer collet envelope abuts the frustoconical bore surface of the receiver bore, when the chuck is in the assembled position.

14. The cutting tool chuck according to claim 12, wherein the collet has:
a plurality of first slots which open to the collet front and extend rearwardly therefrom towards the collet rear; and
a plurality of second slots which open to the collet rear and extend forwardly therefrom towards the collet front, wherein:
the first slots alternate with the second slots in a circumferential direction of the collet.

15. The cutting tool chuck according to claim 12, wherein:
the outer collet envelope has a peripheral outer slot which defines a front outer surface and a rear outer surface of the outer collet envelope; and
the peripheral outer slot is opposite the peripheral outer slot.

* * * * *